US006774581B2

(12) United States Patent
Choi et al.

(10) Patent No.: US 6,774,581 B2
(45) Date of Patent: Aug. 10, 2004

(54) ELECTRODELESS LAMP SYSTEM

(75) Inventors: Joon-Sik Choi, Seoul (KR); Yong-Seog Jeon, Gwangmyeong (KR); Hyo-Sik Jeon, Gwangmyeong (KR); Hyun-Jung Kim, Seoul (KR); Ji-Young Lee, Gwangmyeong (KR); Byeong-Ju Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/212,121

(22) Filed: Aug. 6, 2002

(65) Prior Publication Data

US 2003/0193299 A1 Oct. 16, 2003

(30) Foreign Application Priority Data

Apr. 10, 2002 (KR) ........................................ 2002/19533

(51) Int. Cl.[7] ................................................ H02K 23/12

(52) U.S. Cl. .................................... 315/248; 315/209 R

(58) Field of Search ................................ 315/246, 248, 315/244, 291, 307, 56–60, 209 R

(56) References Cited

U.S. PATENT DOCUMENTS 4,383,203 A * 5/1983 Stanley ........................ 315/248
5,541,482 A * 7/1996 Siao ........................... 315/248

* cited by examiner

*Primary Examiner*—Wilson Lee
(74) *Attorney, Agent, or Firm*—Birch, Stewart, Kolasch & Birch, LLP

(57) ABSTRACT

Disclosed is an electrodeless lamp system, including a microwave generator generating microwaves, a microwave resonator including a cavity coupled with the microwave generator and an LC resonance circuit constituted with an inductor and a capacitor so as to make the microwaves trapped inside the cavity to resonate with the LC resonance circuit, and a light-emitting unit coupled with the cavity to form plasma by the resonating microwaves so as to emit light.

28 Claims, 14 Drawing Sheets

ELECTRODELESS LAMP SYSTEM

BACKGROUND OF THE INVENTION

1. Field of the Invention

The present invention relates to an electrodeless lamp system using microwaves.

2. Background of the Related Art

Generally, an electrodeless system is a lighting apparatus for providing the excellent intensity of radiation without electrodes, in which microwaves generated from a microwave generator such as a magnetron forms plasma from a luminescent material inside a lamp bulb so as to emit light continuously.

FIG. 1 illustrates a cross-sectional view of an electrodeless lamp system according to a related art.

Referring to FIG. 1, in an electrodeless lamp system according to a related art, a magnetron 2, a transformer 3, a waveguide 4, and the like are installed inside a casing 1 and a lamp bulb 5 and a resonator 6 are formed outside the casing 1. Thus, microwaves generated from the magnetron 2 are guided to the resonator 6 using the waveguide 4, whereby the luminescent material inside the light bulb 5 forms plasma to emit light.

Specifically, the electrodeless lamp system according to the related art includes a magnetron 2 loaded inside a casing 1 so as to generate microwaves, a transformer 3 boosting an AC power source for commercial use up to a high voltage so as to supply the magnetron 2 with the high voltage, a waveguide 4 communicated with an outlet of the magnetron 2 so as to transfer microwaves generated from the magnetron 2, a lamp bulb 5 emitting light in a manner that a luminescent material sealed inside the lamp bulb 5 forms plasma by microwave energy, a resonator 6 covering fronts of the waveguide 4 and lamp bulb 5 so as to cut off the microwaves and transmits the light emitted from the lamp bulb 5, a reflective mirror 7 received in the resonator 6 so as to reflect the light emitted from the lamp bulb 5, a dielectric substance mirror 8 installed inside the resonator 6 at a rear side of the lamp bulb 5 so as to transmit the microwaves and reflect the light, and a cooling fan assembly 9 installed at one side of the casing 1 so as to cool the magnetron 2 and transformer 3.

Numerals 'M1' and 'M2' in the drawing indicate a lamp bulb motor revolving the lamp bulb and a fan motor revolving a cooling fan, respectively.

Operation of the electrodeless lamp system according to the related art is explained as follows.

Once a driving signal is inputted to the transformer 3 in accordance with a command of a control unit(not shown in the drawing), the transformer 3 boosts an AC power source so as to supply the magnetron 2 with the boosted high voltage. The magnetron 2 then generates the microwaves of high frequency.

The microwaves are transferred to an inside of the resonator 6 through the waveguide 4, and then the luminescent material in the lamp bulb 5 forms plasma so as to emit light having an intrinsic emission spectrum. The light is reflected on the reflective mirror 7 and dielectric substance mirror 8 toward a front side so as to brighten a space.

Yet, the electrodeless lamp system according to the related art includes the cylindrical waveguide 4 installed between the magnetron 2 and resonator 6 so as to guide the microwaves, whereby a total volume of the system increases as big as the volume of the waveguide 4. Thus, the related art is limited to providing a compact product.

Moreover, the electrodeless system needs to be airtight for stability, endurance, and the like of the product in areas such as the outdoors, dusty areas, and the like.

SUMMARY OF THE INVENTION

Accordingly, the present invention is directed to an electrodeless lamp system that substantially obviates one or more problems due to limitations and disadvantages of the related art.

An object of the present invention is to provide an electrodeless lamp system having a simpler constitution so as to make a compact-sized product and control an operational frequency of the system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an electrodeless lamp system according to the present invention includes a microwave generator generating microwaves, a microwave resonator including a cavity coupled with the microwave generator and an LC resonance circuit constituted with an inductor and a capacitor so as to make the microwaves trapped inside the cavity to resonate with the LC resonance circuit, and a light-emitting unit coupled with the cavity to form plasma by the resonating microwaves so as to emit light.

Preferably, the microwave resonator further comprises a microwave feeder unit connected to an outlet of the microwave generator so as to guide the microwaves inside the cavity.

Preferably, the light-emitting unit includes a lamp bulb filled with a light emitting material emitting light by forming plasma by microwaves, a filter member coupled with a circumference of an opening formed at the cavity so as to transmit the microwaves inside the cavity but reflect the light emitted from the lamp bulb toward an outside of the cavity, and a cut-off member coupled with a circumference of the filter member so as to form a space for installing the lamp bulb, transmit the light, and cut off the microwaves not to leak outside.

Preferably, the inductor is formed by a plurality of first conductive members extending from an inner surface of the cavity toward an inner side of the cavity and the capacitor is formed between a second conductive member coupled with end portions of the second conductive members, the first conductive members, and the inner surface of the cavity so as to form the LC resonance circuit.

Preferably, the cavity includes a coupling unit coupled with the microwave generator, an opening coupled with the light-emitting unit so as to confront the coupling unit, and a sidewall portion connecting the coupling unit to the opening.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
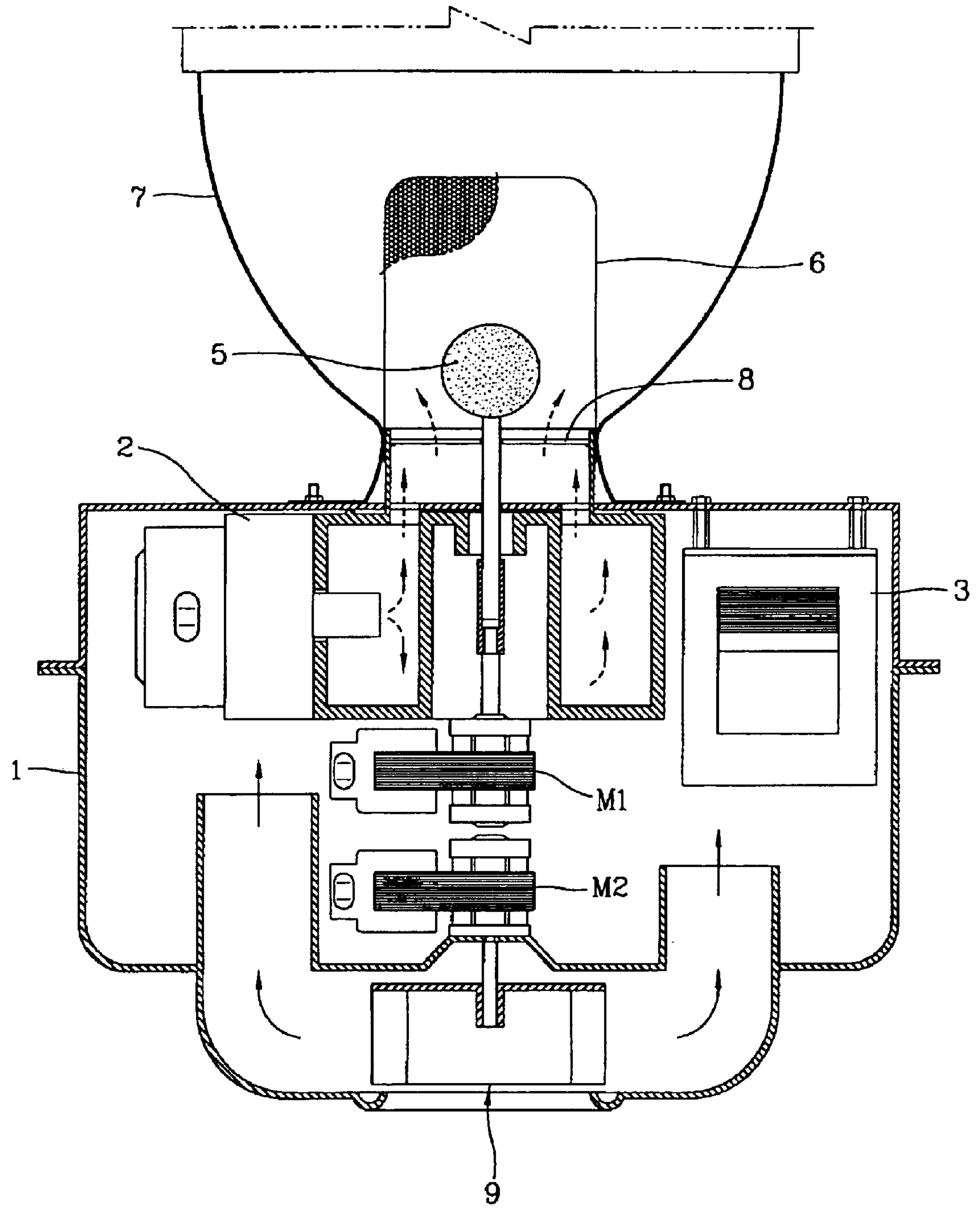
FIG. 1 CONVENTIONAL ART
FIG. 1 illustrates a cross-sectional view of an electrodeless lamp system according to a related art.
Figure 2:
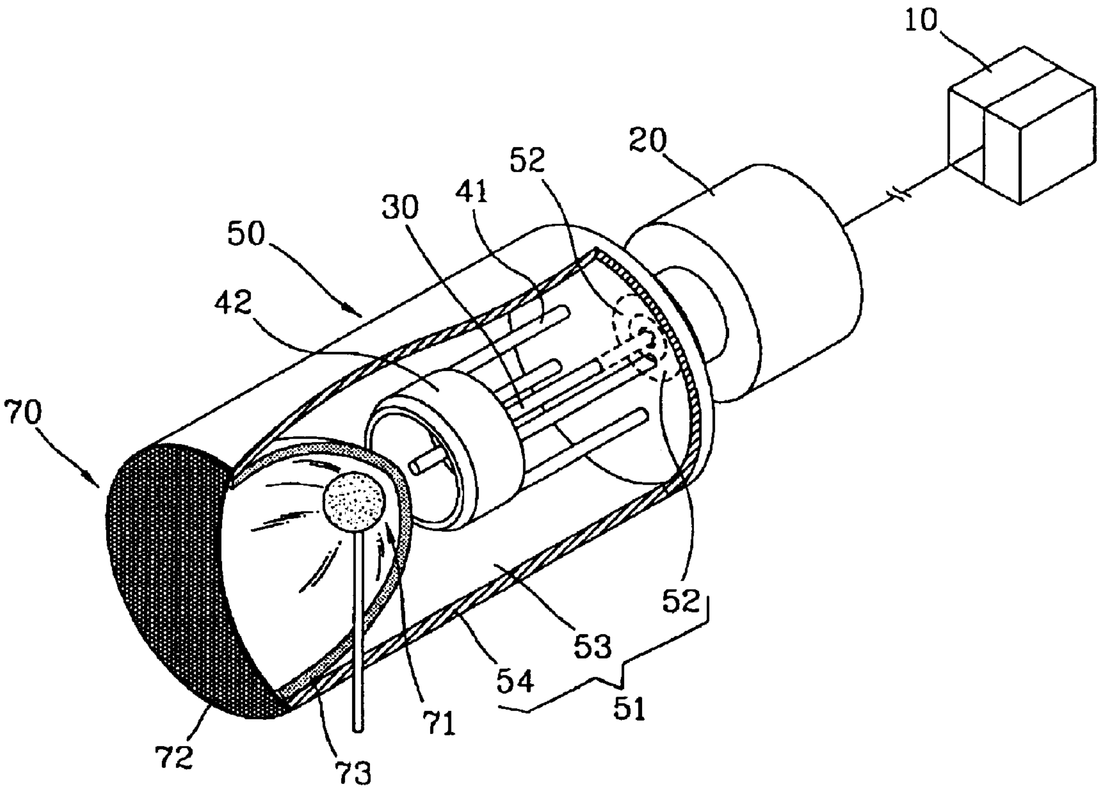
FIG. 2 illustrates a partially open view of an electrodeless lamp system according to the present invention.
Figure 3:
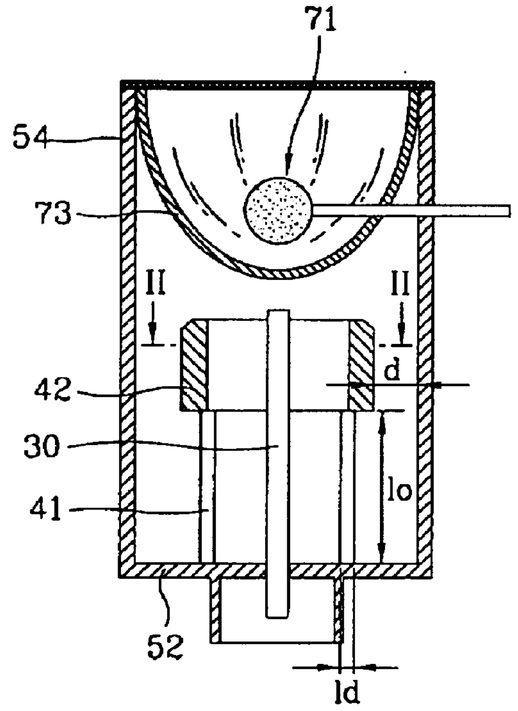
FIG. 3 illustrates a cross-sectional view of an electrodeless lamp system according to the present invention.
Figure 4:
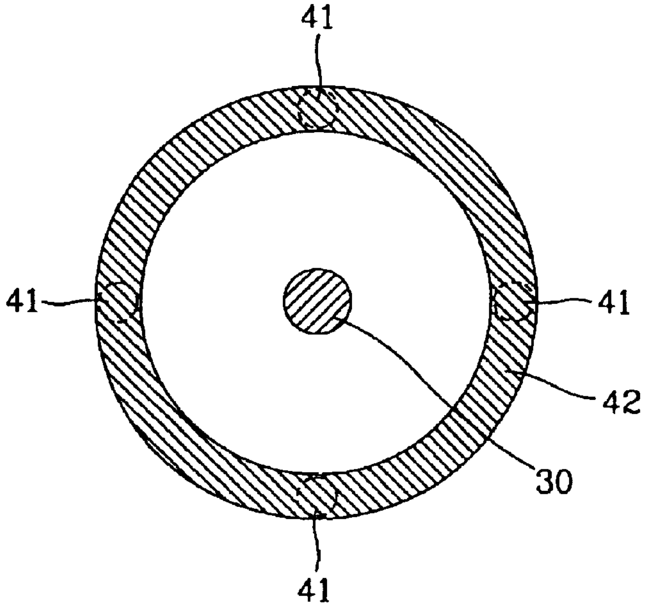
FIG. 4 illustrates a cross-sectional view bisected along a cutting line II—II in FIG. 3.

FIG. 2 illustrates a partially open view of an electrodless lamp system according to the present invention, FIG. 3 illustrates a cross-sectional view of an electrodeless lamp system according to the present invention, and FIG. 4 illustrates a cross-sectional view bisected along a cutting line II—II in FIG. 3.

Referring to FIG. 2 to FIG. 4, an electrodeless lamp system according to the present invention includes a microwave generator 20 generating microwaves by an external power supply 10, a cavity coupled with the microwave generator 20, an LC resonance circuit constituted with inductor and capacitor so as to be installed inside the cavity 51, a microwave resonator 50 trapping the microwaves inside the cavity 51 so as to resonate the microwaves with the LC resonance circuit, a light-emitting unit 70 coupled with the cavity 51 so as to emit light by forming plasma by the resonating microwave.

The microwave generator 20 is an apparatus for transforming electric energy into a radio frequency(RF) energy such as microwaves, and includes a magnetron, a solid state power module (SSPM), or the like.

The cavity 51, as shown in FIG. 2, has a cylindrical shape, and includes a coupling unit 52 coupled with the microwave generator 20, an opening 54 coupled with the light-emitting unit 70 so as to confront the coupling unit 52, and a sidewall portion 54 connecting the coupling unit to the opening 54.

Figure 5A:
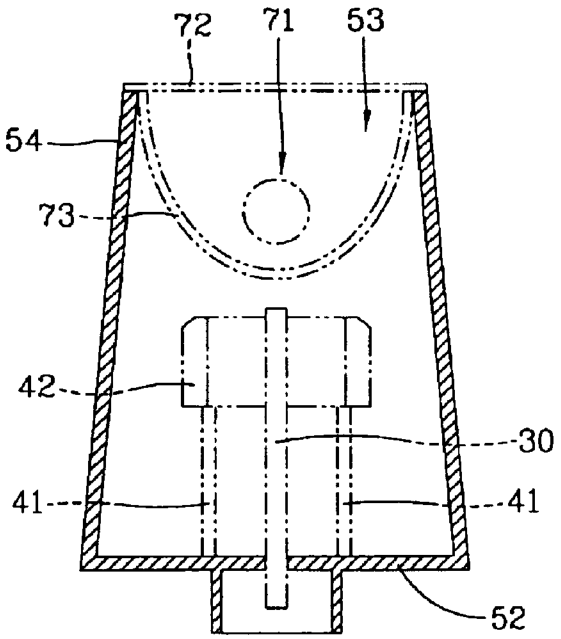
FIG. 5A and FIG. 5B illustrate cross-sectional views of exemplary embodiments of cavities of an electrodeless lamp system according to the present invention.
Figure 5B:
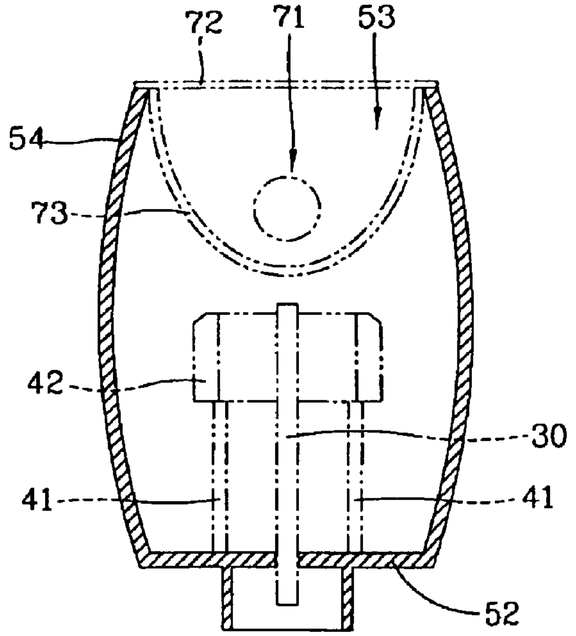

FIG. 5A and FIG. 5B illustrate cross-sectional views of exemplary embodiments of cavities of an electrodeless lamp system according to the present invention.

Referring to FIG. 5A and FIG. 5B, the sidewall portion 54 can have various cross-sectional figures, have a tapered portion in a length direction, and be formed convex outwardly.

The microwave resonator 50 further includes a microwave feeder unit 30 guiding the microwaves inside the cavity 51, and one end of the microwave feeder unit 30 is connected to an outlet(not shown in the drawing) of the microwave generator 20. The microwave feeder unit 30 extends long inwardly from the coupling unit 52 of the cavity 51 so as to guide the microwaves generated from the microwave generator 20 inside the cavity 51.

Figure 6:
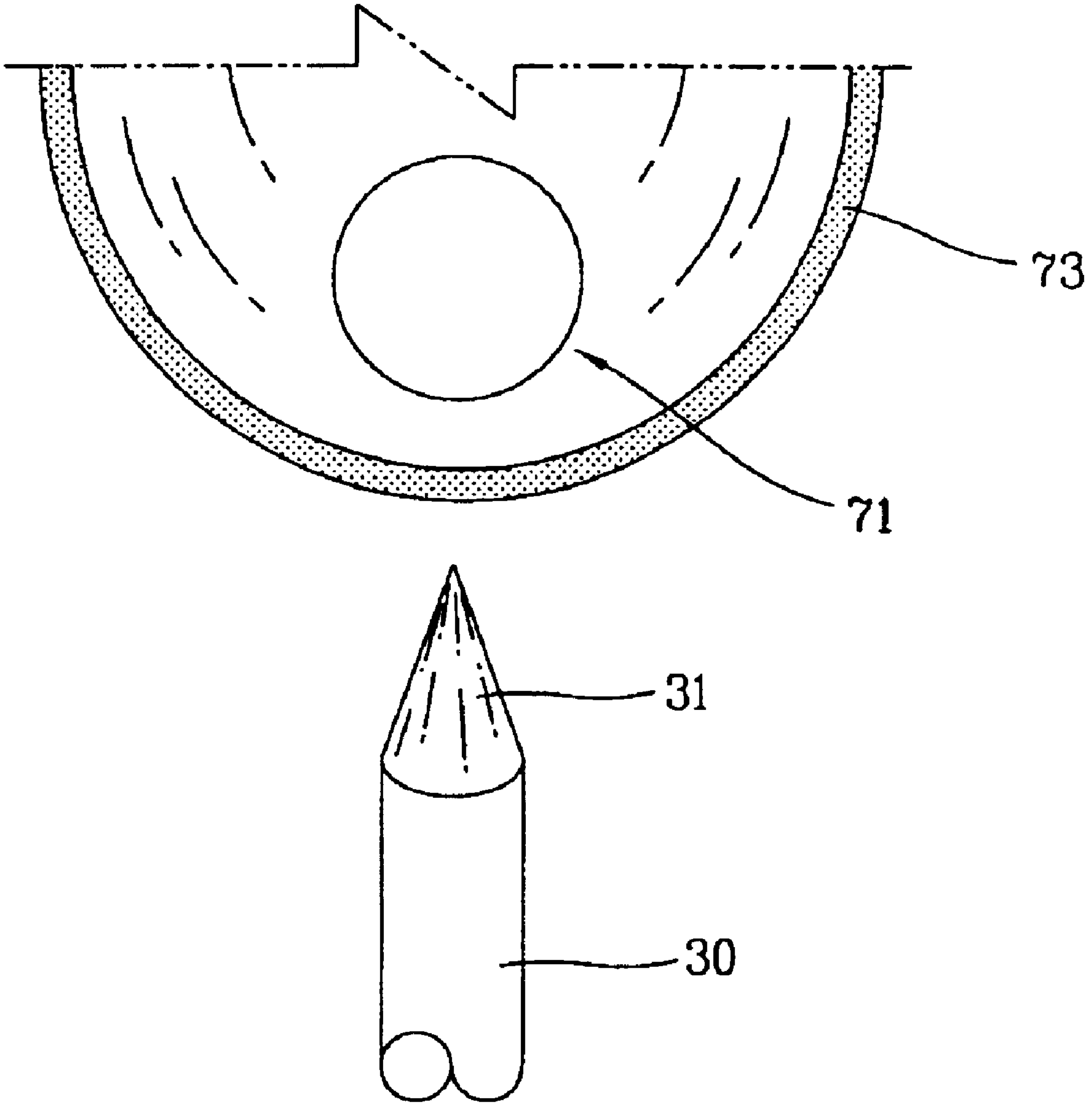
FIG. 6 illustrates a detailed diagram of an end portion of a microwave feeder unit of an electrodeless lamp system according to the present invention.
Figure 7A:
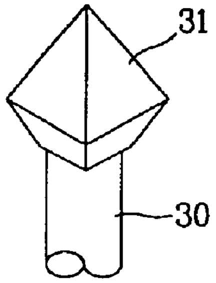
FIGS. 7A to 7F illustrate bird's-eye views of end portions of a microwave feeder unit in an electrodeless lamp system.
Figure 7B:
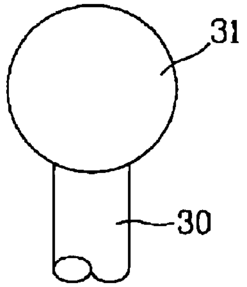
Figure 7C:
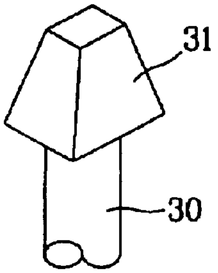
Figure 7D:
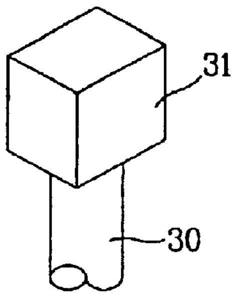
Figure 7E:
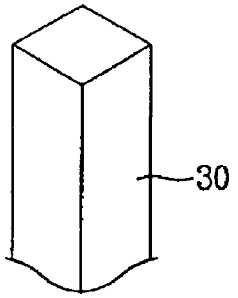
Figure 7F:
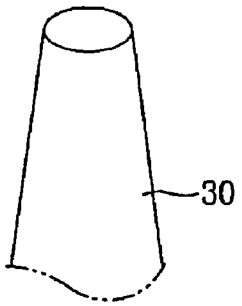

FIG. 6 illustrates a detailed diagram of an end portion of a microwave feeder unit of an electrodeless lamp system according to the present invention, and FIGS. 7A to 7F illustrate bird's eye views of end portions of a microwave feeder unit in an electrodeless lamp system.

Referring to FIG. 6 and FIGS. 7A to 7F, the microwave feeder unit 30 has a shape of a solid rod. If an end portion 31 of the microwave feeder unit 30 adjacent to the light-emitting unit 70 is formed to have an angular shape, a spherical shape, a tapered shape, or the like, an electric field is concentrated on the end portion so as to increase an intensity of the electric field. Thus, as the stronger electric field is applied to the light-emitting unit 70, the luminescent material is easily transformed into plasma on initial lighting. Hence, an initial lighting time can be reduced remarkably. Moreover, the end portion 31 of the microwave feeder unit 30 can have a tapered shape.

The microwave feeder unit 30 is made of a rod having a polygonal or circular cross-section, and the end portion of the microwave feeder unit can have one of various shapes such as a sphere, a pyramid, a cone, a hexahedron, and the like. Besides, a plurality of cross-sectional shapes can be formed in a length direction of the microwave feeder unit 30.

Figure 8:
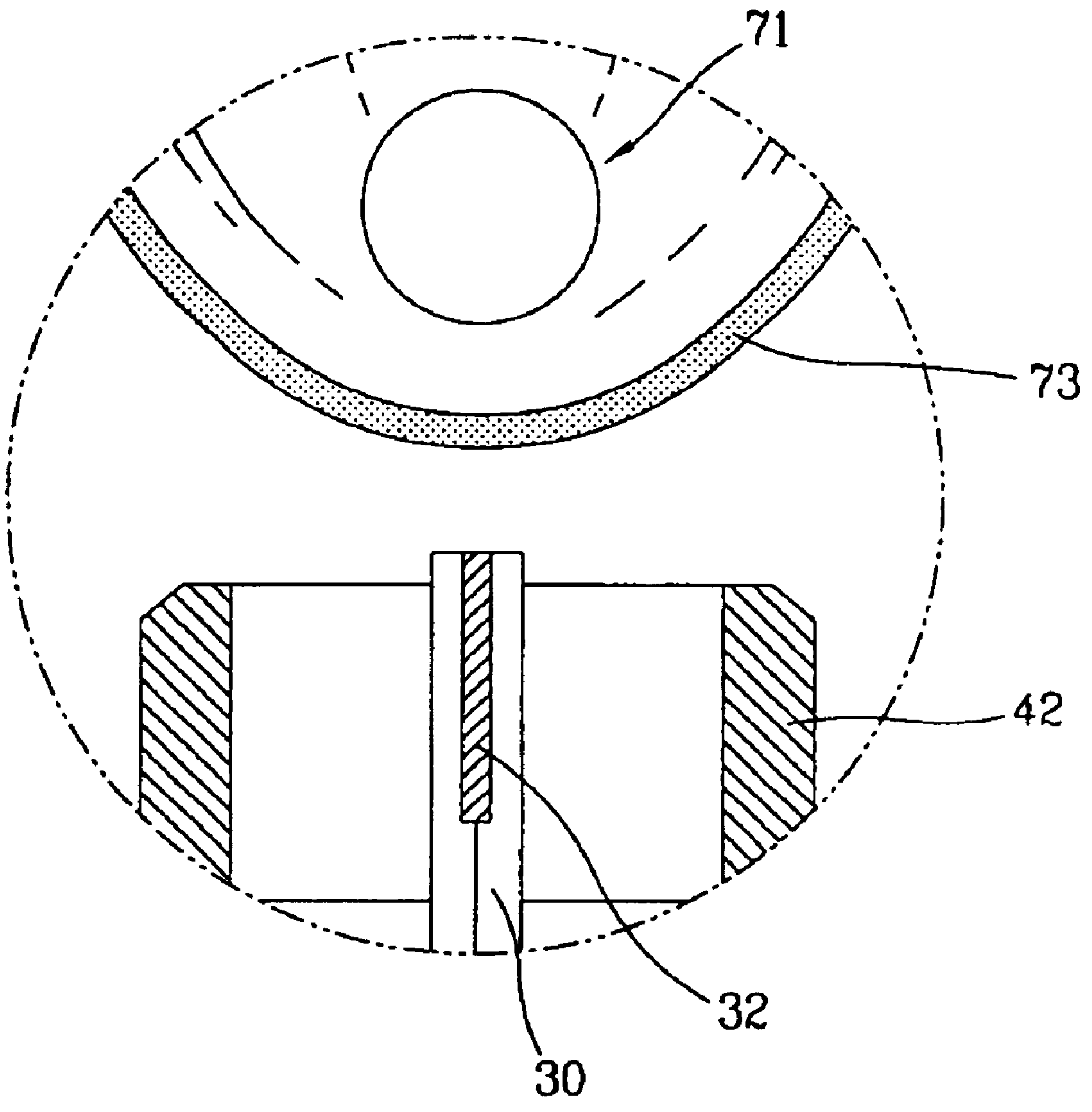
FIG. 8 illustrates a partial cross-sectional view of a microwave feeder unit to which an electric field intensifying member is added in an electrodeless lamp system according to the present invention.
Figure 9A:
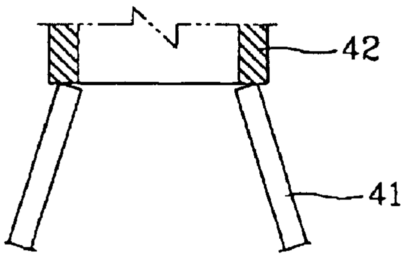
FIGS. 9A to 9E illustrate magnified views of first conductive members in an electrodeless lamp system according to the present invention.
Figure 9B:
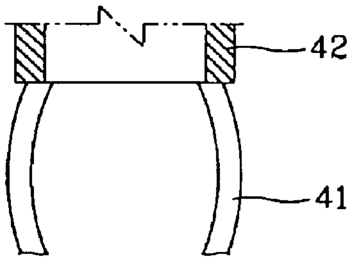
Figure 9C:
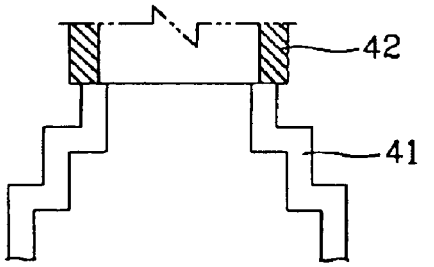
Figure 9D:
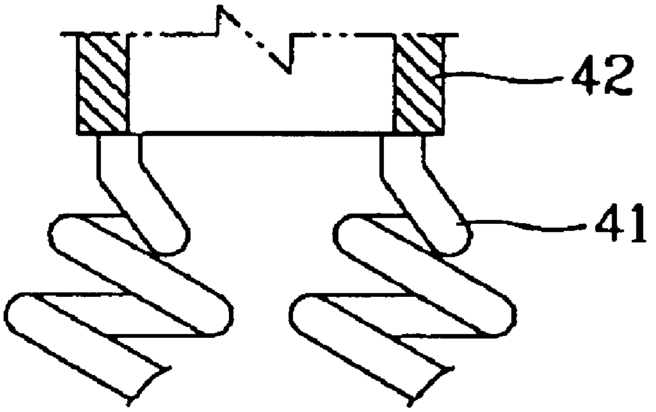
Figure 9E:
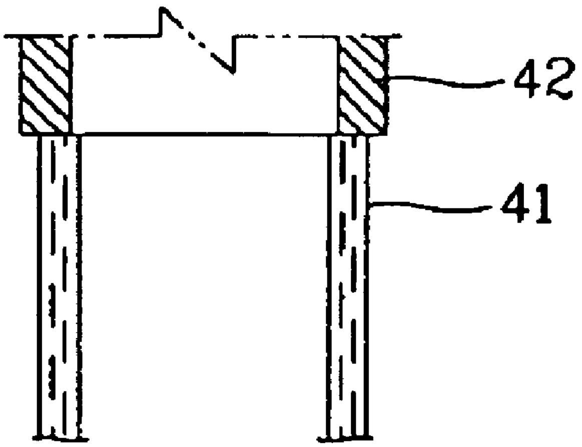

FIG. 8 illustrates a partial cross-sectional view of a microwave feeder unit to which an electric field intensifying member is added in an electrodeless lamp system according to the present invention.

Referring to FIG. 8, an electric field intensifying member 32 can be installed additionally inside the microwave feeder unit 30 so as to intensify the electric field on the lamp bulb 71 of the light-emitting unit 70. Namely, the electric field intensifying member 32 is twisted helically so as to be buried in the microwave feeder unit 30.

In this case, the electric field intensifying member 32 requires no additional area to occupy, thereby enabling to decrease the number of components.

Meanwhile, the LC resonance circuit of the microwave resonator 50 is formed by a reciprocal reaction between a first conductive member 41, a second conductive member 43, and the electric field generated from the microwaves inside the cavity 51 of the sidewall portion 54.

Namely, the first conductive member 41 is constituted with a plurality of rods arranged radially centering around the microwave feeder unit 30 so as to form an inductor.

And, a capacitor is formed between the second conductive member 42 and sidewall portion 54 of the cavity 51 as well as another capacitor is formed in part between the first conductive member 41 and sidewall portion of the cavity 54.

In this case, a capacitance C of the capacitor formed between the second conductive member 42 and the sidewall portion of the cavity 51 and an inductance L of the inductor formed by the first conductive member 41 satisfy the following Formula 1 and Formula 2.

[Formula 1]

$$C \propto \frac{\varepsilon S}{d},$$

where ∈ is a dielectric constant and S is a surface area of the second conductive member 42 facing the sidewall portion 54 of the cavity.

[Formula 2]

$$L \propto \frac{l_0}{l_d},$$

where d is a distance between the sidewall portion 54 of the cavity 51 and the second conductive member 42, $l_o$ is a length of the first conductive member 41, and $l_d$ is a thickness of the first conductive member 41.

Besides, a resonance frequency $f_r$ of the LC resonance circuit satisfies Formula 3.

[Formula 3]

$$f_r \propto \frac{1}{\sqrt{LC}}$$

Specifically, the inductance is proportional to the length of the first conductive member 41 as shown in Formula 1 as well as in inverse proportion to a width of the first conductive member 41.

Using the above relations, it is able to adjust the resonance frequency of the LC resonance circuit. Substantially, the structure of the electrodeless lamp system according to the present invention such as dimensions of components (elements) can be modified freely.

FIGS. 9A to 9E illustrate magnified views of first conductive members in an electrodeless lamp system according to the present invention.

Referring to FIGS. 9A to 9E, the first conductive member 41 can be realized into one of various forms.

Namely, the first conductive member 41 can be installed so as to incline to the coupling unit 52 of the cavity 51, form a curved shape in a length direction, form a step-like shape in a length direction, or form a coil shape in a length direction.

Moreover, the first conductive member 41 can be made of a dielectric rod coated with a patterned conductive material.

FIGS. 10A to 10D illustrate partially magnified views of second conductive members in an electrodeless lamp system according to the present invention.

Referring to FIGS. 10A to 10D, in order to increase a capacitance effect of the capacitor formed between the second conductive member 42 and the sidewall portion 54 of the cavity 51, the second conductive member 42 can be modified variously using the principle of Formula 1.

Figure 10A:
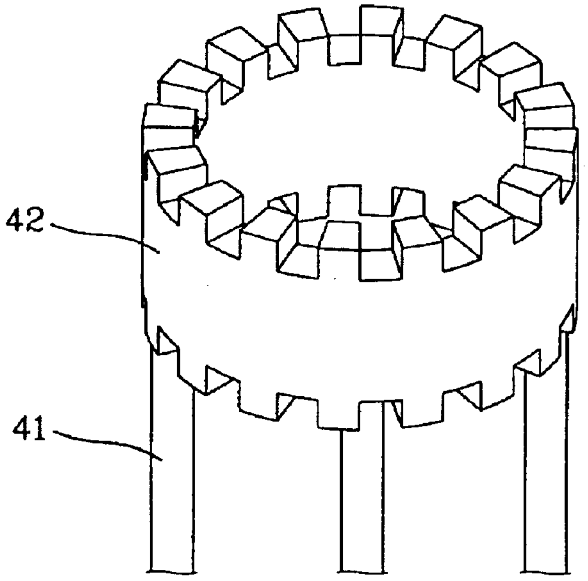
FIGS. 10A to 10D illustrate partially magnified views of second conductive members in an electrodeless lamp system according to the present invention.
Figure 10B:
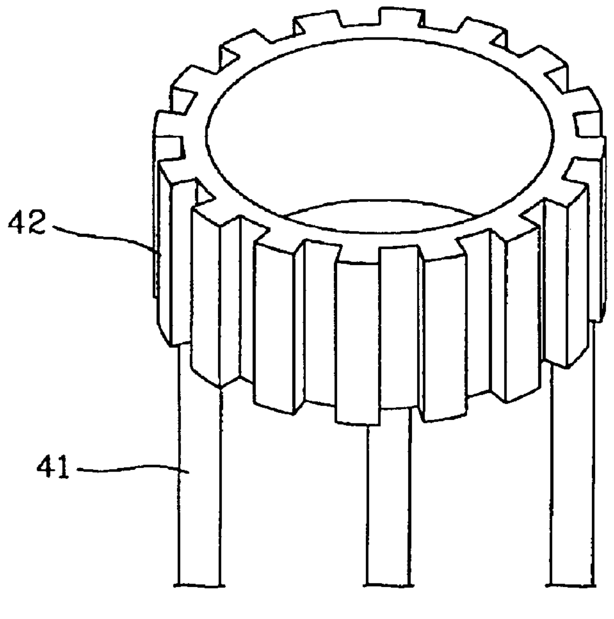
Figure 10C:
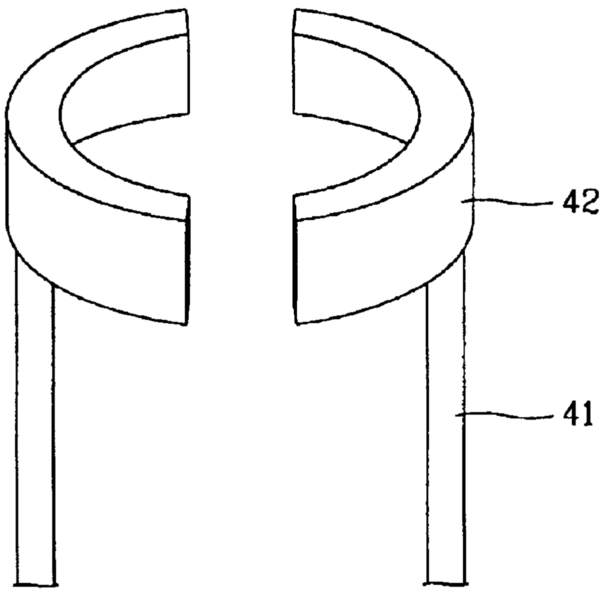
Figure 10D:
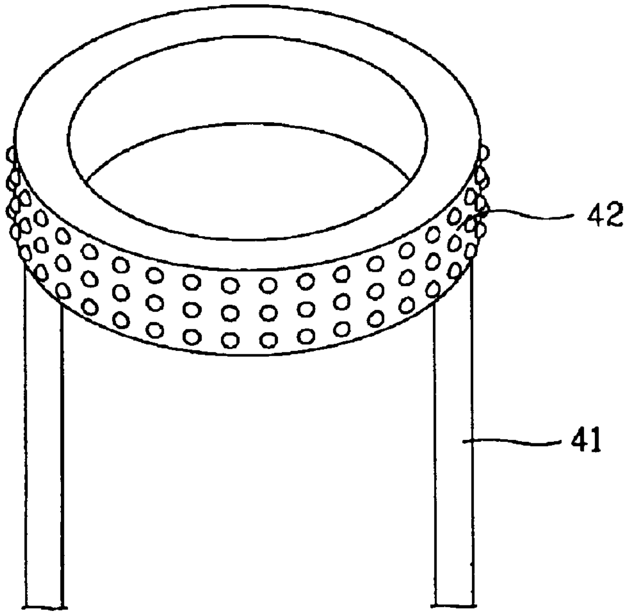

Namely, the second conductive member 42, as shown in FIG. 10A and FIG. 10D, has a plurality of protrusions on its surface or is formed of a dielectric material coated with a patterned conductive material. Namely, a surface area of the second conductive member 42 can be increased relatively by forming a step difference portion at both upper and lower ends or a surface of the second conductive member 42 or modifying a shape of the cavity 51.

Moreover, as is the case with the inductor, if a conductive pattern is formed on the surface of the second conductive member 42, it is able to increase the surface area of the capacitor per unit volume so as to reduce a size of the electrodeless lamp system. Moreover, the second conductive member 42 can have a ring shape or a plurality of separated ring shapes.

Figure 11:
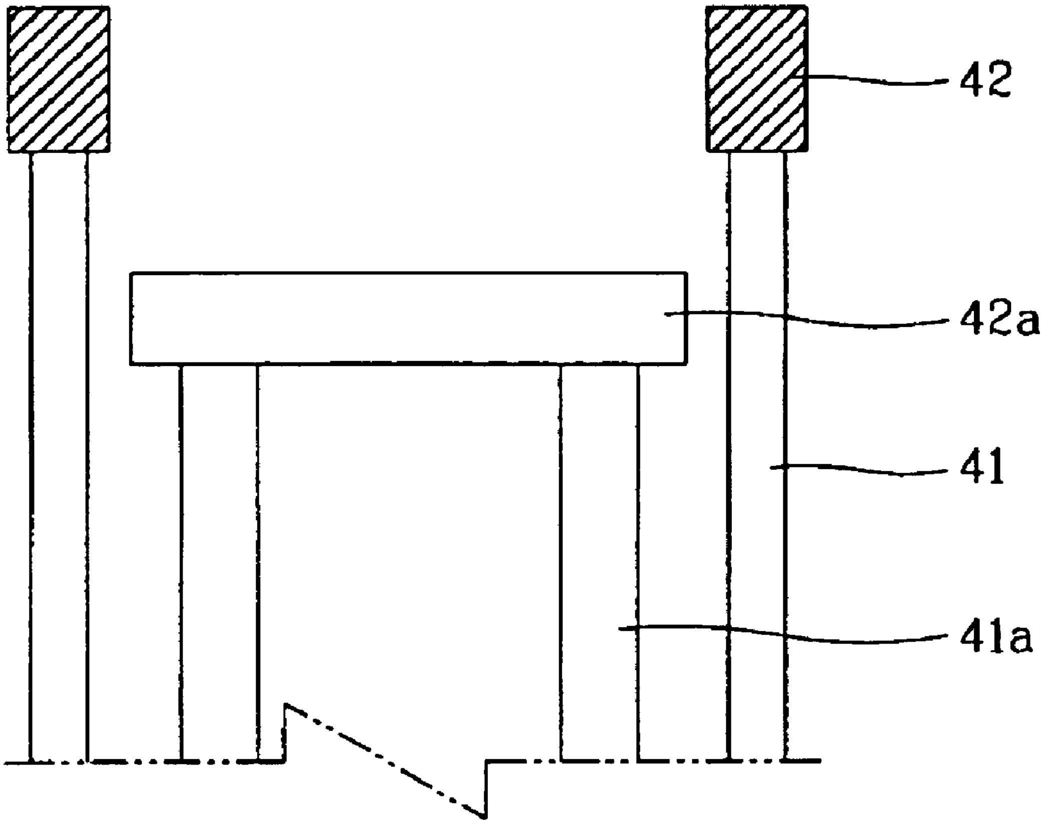
FIG. 11 illustrates a partially magnified diagram of third and fourth conductive members installed additionally at an electrodeless lamp system according to the present invention.

FIG. 11 illustrates a partially magnified diagram of third and fourth conductive members installed additionally at an electrodeless lamp system according to the present invention.

Referring to FIG. 11, a third conductive member 41*a* shorter than the first conductive member 41 extends from an inner surface of the cavity 51 so as to form an additional inductor.

And, a fourth conductive member 42*a* coupled with an end of the third conductive member 41*a* is further included, whereby an additional capacitor is formed between the fourth conductive member 42*a* and the inner surface of the cavity 51.

The light-emitting unit 70 includes a lamp bulb 71 filled with a light emitting material emitting light by forming plasma by microwaves, a filter member 73 coupled with a circumference of the opening 53, formed at the cavity 51 so as to transmit the microwaves inside the cavity 51 but reflect the light emitted from the lamp bulb 71 toward an outside of the cavity 51, and a cut-off member 72 coupled with a circumference of the filter member 73 so as to form a space for installing the lamp bulb 71, transmit the light, and cut off the microwaves not to leak outside.

Figure 12:
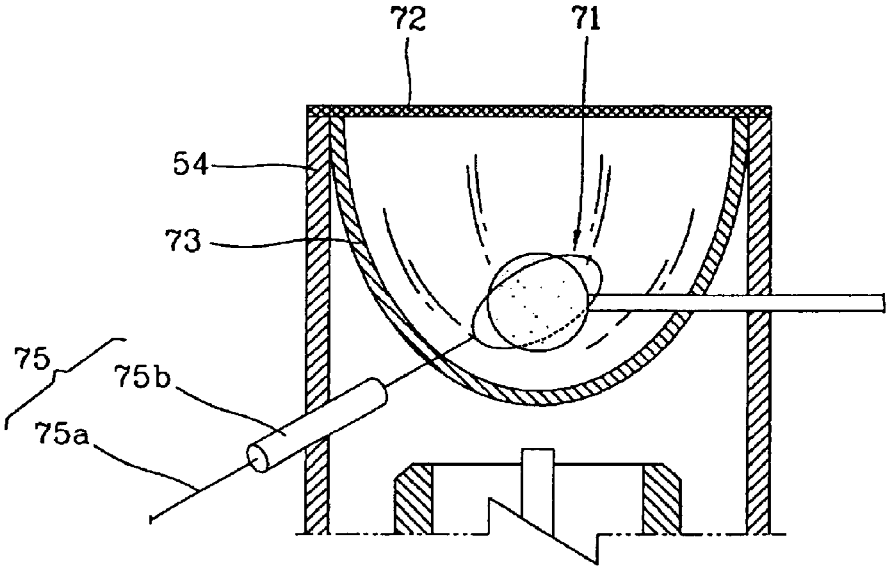
FIG. 12 illustrates a partially magnified view of a case that an electric field intensifying member is installed near a lamp bulb in an electrodeless lamp system according to the present invention.

FIG. 12 illustrates a partially magnified view of a case that an electric field intensifying member is installed near a lamp bulb in an electrodeless lamp system according to the present invention.

Referring to FIG. 12, an electric field intensifying member 75 can be installed outside the lamp bulb 71 additionally. In order to increase an intensity of the electric field applied to the lamp bulb 71, the electric, field intensifying member 75 is loaded on a portion adjacent to the light-emitting unit 70. Numerals '75*a*' and '75*b*' are a power supply wire and an insulator, respectively.

The cut-off member 72 is made of a, net enabling to cut off leakage of microwaves but transmit light. And, in the embodiment of the present invention, a front portion is formed of the net only. Yet, the form of the cut-off member 72 can be modified into various forms by general experiments and efforts if necessary.

The cut-off member 72 made of the net is prepared separately, and then assembled with the cavity 51 by welding, clamping, or another fixing system.

The lamp bulb 71 has a spherical or cylindrical shape, and made of a material having a high transmittance and a minute dielectric loss such as quartz. And, the lamp bulb 71 enables to include a revolving device (not shown in the drawing) suing an additional connecting member for cooling and the like.

The light-emitting materials include a material for electric discharge such as metal, halogen based compound, sulfur, selenium leading light emission by forming plasma during operation of the lamp bulb 71, inert gas such as Ar, Xe, Kr, and the like for forming plasma inside the lamp bulb at initiation of light emission, and an electric discharge catalyst such as Hg so as to adjust spectrum of the generated light or help the initial electric discharge to ease the lighting.

The filter member 73 is a member reflecting light but transmitting microwaves, and has an oval figure having a constant curvature or a shape similar to the oval figure so as to be coupled with the opening 53 of the cavity 51. Moreover, the filter member 73 is formed of a dielectric material enabling to transmit the microwaves freely such as quartz or aluminum.

Figure 13:
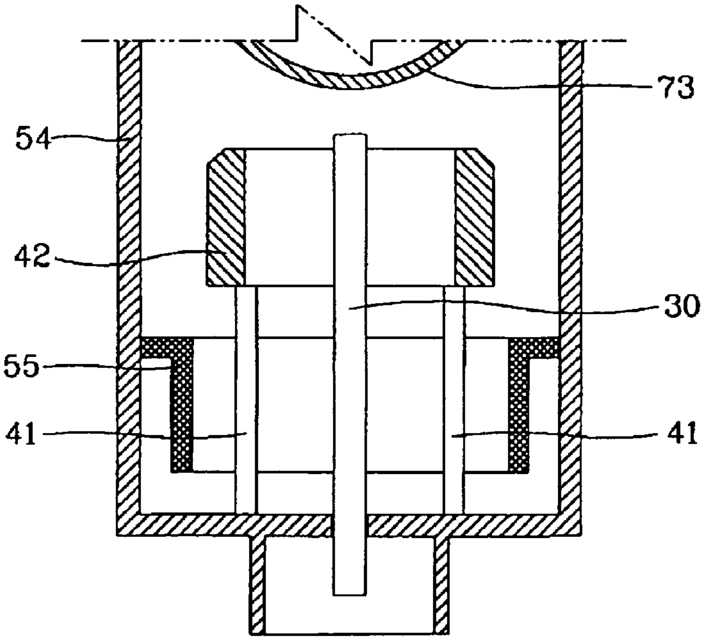
FIG. 13 illustrates a cross-sectional view of a case that an EMI filter is installed at an electrodeless lamp system according to the present invention.

FIG. 13 illustrates a cross-sectional view of a case that an EMI filter is installed at an electrodeless lamp system according to the present invention.

Referring to FIG. 13, an EMI filter 54 is preferably installed inside the cavity 5 so as to remove a microwave component of unstable microfrequency (oscillation) generated outside the cavity 51.

The above-described electrodeless lamp system according to the present invention has the following effects or advantages.

The microwave generator 20 is supplied with the power from the external power supply 10 in accordance with the operational signal of the control unit (not shown in the drawing), and then generates the microwaves having RF energy.

The microwaves are induced inside the cavity 51 of the microwave resonator 50 through the microwave feeder unit 30 so as to resonate inside the cavity 51. In this process, the frequency signal is inputted to the LC resonance circuit including the inductor and capacitor constituted with the first and second conductive members and the inner surface of the cavity 51 so as to select a resonance frequency suitable for the LC resonance circuit.

The microwaves at this resonance frequency band resonate inside the cavity of the microwave resonator 50 to excite the light-emitting material put in the lamp bulb 71 of the light-emitting unit 70 so as to form plasma. And, the plasma maintains electric discharge continuously by the microwaves so as to emit white natural light of high luminous intensity. The light is reflected on the cut-off member 72 toward a front side to pass the filter member 73 so as to brighten a required space.

In this case, the electric field intensifying member 75 or 32 is installed near the light-emitting unit 70 to strengthen the intensity of the electric field applied to the lamp bulb 71, whereby the inert gas in the lamp unit 60 is transformed into a plasma state on initial lighting more quickly. Thus, the lighting time is reduced.

Moreover, the EMI filter 55 is installed near the LC circuit to remove oscillation (or noise), whereby operation as an interfering wave to other electronic system can be prevented previously.

Thus, the microwave feeder unit is installed inside the microwave resonator guiding the microwave generated from the microwave generator (magnetron), thereby enabling to provide a compact electrodeless lamp system.

Moreover, as the resonance frequency is selected using the LC resonance technique constituted with the inductor L and capacitor C, the resonance frequency is controllable so as to stabilize the luminous intensity of a lighting system.

Specifically, the first and second conductive members are adjusted suitably in controlling the resonance frequency, thereby enabling to adjust an overall size of the electrodeless lamp system.

And, The present invention installs the microwave feeder unit inside the microwave resonator guiding the microwave generated from the microwave generator (magnetron), thereby enabling to reduce a size of the electrodeless lamp system.

Moreover, the resonance frequency can be controlled easily by modifying the shape of the inductor and capacitor, thereby enabling to change the luminous intensity suitable for necessity.

Furthermore, as the structure of the microwave generator and microwave resonator is partitioned off, thereby enabling to cool the electrodeless lamp system smoothly as well as make the system airtight.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An electrodeless lamp system comprising:

a microwave generator generating microwaves;

a microwave resonator including a cavity coupled with the microwave generator and an LC resonance circuit constituted with an inductor and a capacitor, the LC resonance circuit being installed in the cavity so as to make the microwaves trapped inside the cavity resonate with the LC resonance circuit; and a light-emitting unit coupled with the cavity to form plasma by the resonating microwaves so as to emit light.

2. The electrodeless lamp system of claim 1, wherein the microwave resonator further comprises a microwave feeder unit connected to an outlet of the microwave generator so as to guide the microwaves inside the cavity.

3. The electrodeless lamp system of claim 2, wherein the microwave feeder unit is connected to the outlet of the microwave generator, penetrates the cavity, and extends toward an inner side of the cavity so as to guide the microwaves generated from the microwave generator inside the cavity.

4. The electrodeless lamp system of claim 2, wherein a shape of an end portion of the microwave feeder unit is selected from a group consisting of a sphere, a pyramid, a cone, and a hexahedron.

5. The electrodeless lamp system of claim 2, wherein a shape of an end portion of the microwave feeder unit is tapered.

6. The electrodeless lamp system of claim 2, wherein the microwave feeder unit is a rod of which cross-section is selected from a group consisting of a polygon and a circle.

7. The electrodeless lamp system of claim 2, wherein an electric field intensifying member is installed inside the microwave feeder unit additionally so as to intensify an electric field of a lamp bulb of the light-emitting unit.

8. An electrodeless lamp system comprising:

a microwave generator generating microwaves;

a microwave resonator including a cavity coupled with the microwave generator and an LC resonance circuit constituted with an inductor and a capacitor so as to make the microwaves trapped inside the cavity resonate with the LC resonance circuit; and a light-emitting unit coupled with the cavity to form plasma by the resonating microwaves so as to emit light;

a lamp bulb filled with a light emitting material emitting light by forming plasma by microwaves;

a filter member formed in a substantially oval shape around the lamp bulb and coupled with an opening formed at the cavity so as to transmit the microwaves inside the cavity but reflect the light emitted from the lamp bulb toward an outside of the cavity; and a cut-off member coupled with the filter member so as to form a space for installing the lamp bulb, transmit the light, and prevent the microwaves from leaking.

9. The electrodeless lamp system of claim 8, wherein an electric field intensifying member is additionally installed outside the lamp bulb so as to intensify an electric field.

10. The electrodeless lamp system of claim 1, wherein the inductor is formed by a first conductive extending from an inner surface of the cavity toward an inner side of the cavity and the capacitor is formed between a second conductive member coupled with end portions of the second conductive member, the first conductive member, and the inner surface of the cavity so as to form the LC resonance circuit.

11. The electrodeless lamp system of claim 10, wherein a third conductive member shorter than the first conductive member extends from the inner surface of the cavity so as to form an additional inductor.

12. The electrodeless lamp system of claim 11, wherein a fourth conductive member is additionally coupled with an end portion of the third conductive member whereby an additional capacitor is formed between the fourth conductive member and the inner surface of the cavity.

13. The electrodeless lamp system of claim 10, wherein the first conductive member inclines to the inner surface of the cavity.

14. The electrodeless lamp system of claim 10, wherein the first conductive member has a curved shape in a length direction.

15. The electrodeless lamp system of claim 10, wherein the first conductive member has a step-like shape in a length direction.

16. The electrodeless lamp system of claim 10, wherein the first conductive member has a coil shape in a length direction.

17. The electrodeless lamp system of claim 10, wherein the first conductive member is a dielectric rod coated with a conductive material.

18. The electrodeless lamp system of claim 10, wherein the microwave resonator further comprises a microwave feeder unit coupled with an outlet of the microwave generator so as to guide the microwaves inside the cavity.

19. The electrodeless lamp system of claim 18, wherein a plurality of the first conductive members is arranged radially centering around the microwave feeder unit.

20. The electrodeless lamp system of claim 10, wherein a plurality of protrusions is formed on a surface of the second conductive member.

21. The electrodeless lamp system of claim 10, wherein the second conductive member is made of a dielectric material coated with a conductive material.

22. The electrodeless lamp system of claim 10, wherein the second conductive member has a ring shape.

23. The electrodeless lamp system of claim 10, wherein the second conductive member has a plurality of separate ring shapes.

24. The electrodeless lamp system of claim 1, the cavity comprising:

a coupling unit coupled with the microwave generator;

an opening coupled with the light-emitting unit so as to confront the coupling unit; and a sidewall portion connecting the coupling unit to the opening.

25. The electrodeless lamp system of claim 24, wherein the cavity has a cylindrical shape.

26. The electrodeless lamp system of claim 24, wherein the sidewall portion is tapered.

27. The electrodeless lamp system of claim 1, wherein a sidewall portion is convex toward an outside of the cavity.

28. The electrodeless lamp system of claim 1, wherein an EMI filter is installed inside the cavity so as to prevent the LC resonance circuit from external influence.

* * * * *